Nov. 27, 1956 P. ALTMAN ET AL 2,771,862
COOLING SYSTEM FOR AIR COOLED ENGINES
Filed May 4, 1954 3 Sheets-Sheet 3

INVENTORS
PETER ALTMAN
BY LAURENCE D. BAKKE
*Hauke & Hardesty*
ATTORNEYS

United States Patent Office 2,771,862
Patented Nov. 27, 1956

2,771,862
COOLING SYSTEM FOR AIR COOLED ENGINES

Peter Altman, Detroit, and Laurence D. Bakke, Plymouth, Mich., assignors to Continental Motors Corporation, Detroit, Mich., a corporation of Virginia Application May 4, 1954, Serial No. 427,560

2 Claims. (Cl. 123—41.65)

This invention relates to internal combustion engines and more particularly to the cooling system for an air cooled single cylinder engine assembly.

Much difficulty has always been experienced in properly cooling these single cylinder air cooled engines. For the most part, this type of engine is employed to power motor mowers, small agricultural equipment, all of which are relatively slow moving as compared to an automotive type of engine. Many applications for this type of engine also involve an installation in stationary power equipment, making it necessary to devise a forced cooling system.

The overall efficiency of an engine goes up substantially in proportion to the efficiency of the cooling system, and many engine failures can be attributed to inefficient cooling, especially with respect to air cooled engines. Therefore, engineers are constantly seeking to improve engine cooling and many such efforts have met with little success. Uniform cooling is one of the essential prerequisites of engine design, particularly with respect to these air cooled engines.

It is an object of the present invention to improve the overall engine efficiency of the single cylinder air cooled engines by constructing a cooling system therefor which effects maximum cooling and which is effective to obtain an overall uniform cooling in order to better and increase the general overall efficiency of the engine, as will be made apparent by the various details of construction as will be hereinafter set forth.

For a more detailed understanding of the invention, reference may be had to the accompanying drawings illustrating a preferred embodiment thereof in which like characters refer to like parts throughout the several views, and in which Fig. 1 is a front elevational view of a single cylinder air cooled engine embodying the novel engine shrouding constructed in accordance with the invention as hereinafter described.

Many experiments have proved that a single cylinder air cooled engine can be cooled only by means of a forced flow of cooling air about the engine, and such flow must of necessity be confined if it is to effect a heat exchange relation with the cooling fins caused by the engine cylinder. Many types of cowling have been tried resulting in many failures because the results were quite often unsatisfactory, either as giving inadequate cooling or non-uniform cooling.

Figure 1:
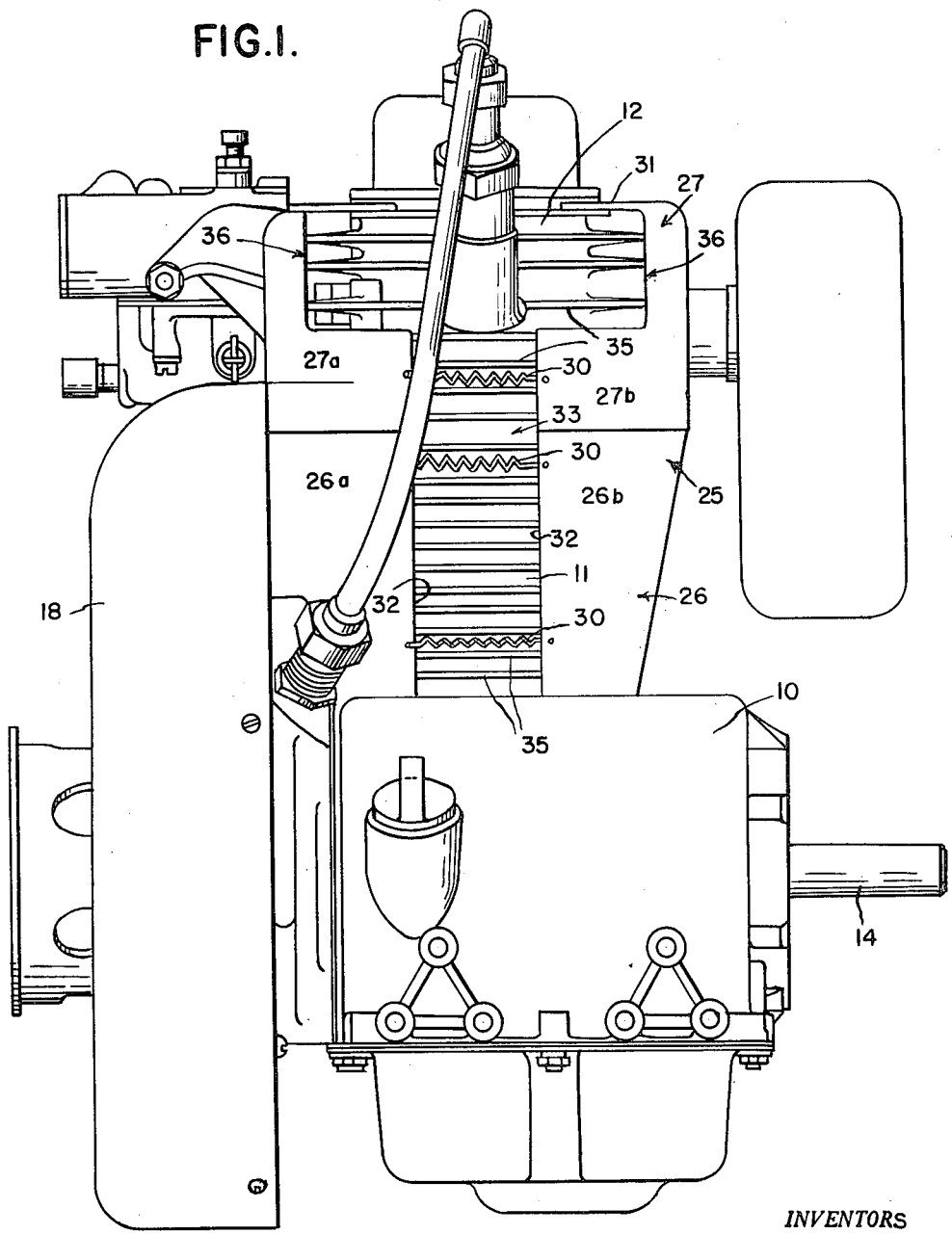
Figure 2:
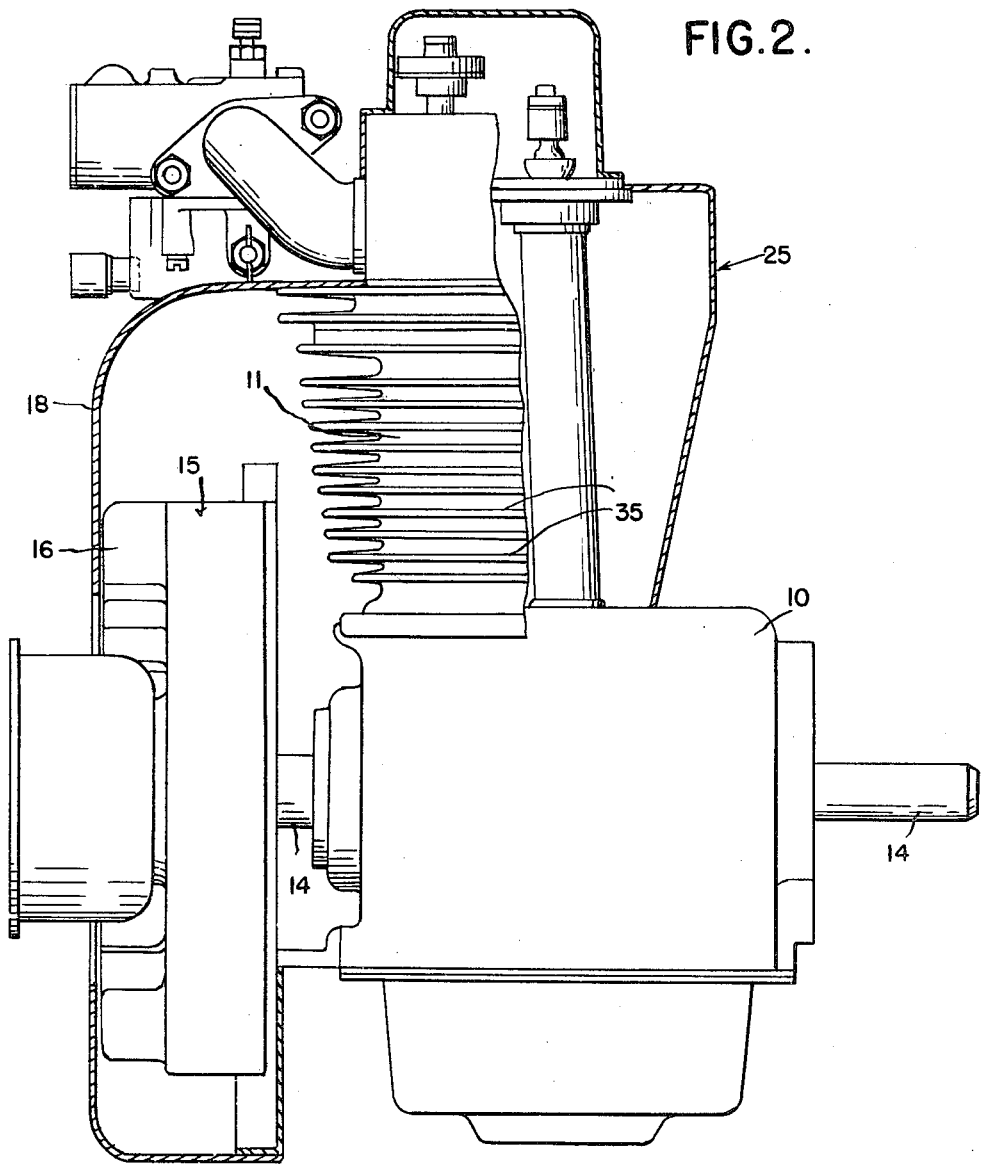
Fig. 2 is a similar front elevational view of the engine showing the shrouding partly in section.
Figure 3:
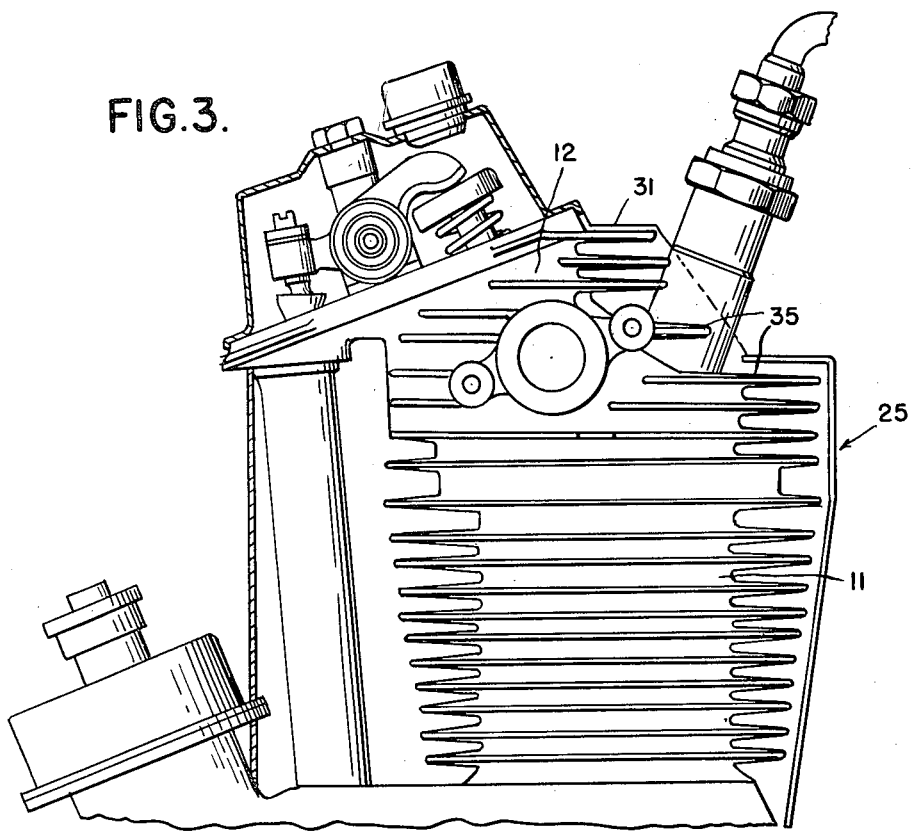
Fig. 3 is a fragmentary sectional view thereof taken substantially at right angles to Fig. 1.

However, the present construction as hereinafter described has proved to be extremely satisfactory as it has resulted in a maximum of cooling and has effected a substantially uniform dispersion of heat. The present engine comprises in general a crankcase structure 10, a cylinder 11, secured to or fastened down to the crankcase, a cylinder head 12, secured to the cylinder and a crankshaft 14 supported by the crankcase and projected beyond the ends thereof (see Fig. 1), one end thereof comprising the power take-off end, and the other end having a magneto flywheel 15 secured thereto, said flywheel being constructed to comprise a blower portion 16 for inducing a forced draft of air over the engine cylinder to cool same.

Figure 4:
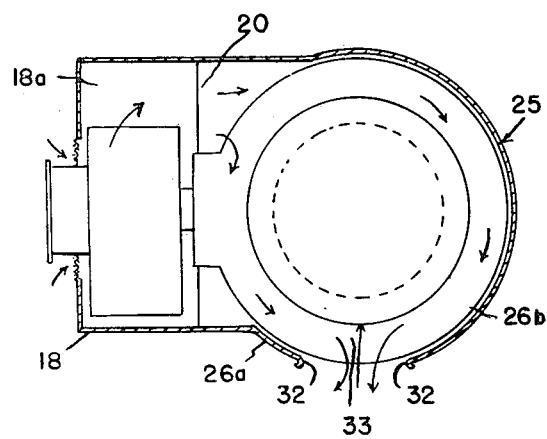
Fig. 4 is a fragmentary diagrammatic plan sectional view showing the general flow of air utilized to obtain the most efficient engine cooling.

The blower is contained within the casing 18, sometimes referred to as the flywheel housing, and it will be observed that this casing 18 comprises a portion closely fitted about the blower and an outlet portion 18a, offset laterally to one side, preferably to the rear of said crankshaft axis, and thus the outlet portion provides an outlet 20, disposed to one side of the crankshaft axis, so located as to discharge the cooling air substantially tangentially with respect to the engine cylinder (see Fig. 4).

The casing 25 encloses the engine cylinder and same comprises in general a cylinder shroud 26 and a cylinder head shroud portion 27. These shrouds are fastened or otherwise secured by any suitable fastening means to the casing 18, and referring to the drawings, it will be noted that the cylinder shroud is preferably constructed of two parts 26a and 26b, said part 26a enclosing a part of the front portion of the cylinder and the part 26b enclosing the back, the opposite end and a part of the front of the cylinder, these shroud parts being fastened together by the springs 30. Likewise the cylinder head shroud portions 27a and 26b are fastened together by a spring 30. The cylinder head shroud also carries a top plane 31 which overlies the engine cylinder head, and thus said shrouds and top plate substantially enclose the entire cylinder and cylinder head assembly, said shroud portions 26a and 26b being preferably constructed integrally with the top plate 31 and said shroud portions 26a and 26b respectively.

It will be noted that the edges 32 of the shroud portions are spaced apart to provide an outlet 33 (Fig. 1), said springs 30 being disposed to span this gap or opening 33 and securely wrap said shroud into a relatively close contacting relation with the peripheral edge of the cylinder and cylinder head fins 35. The upper part of said shroud portions 27a and 27b are cut away or recessed as at 36 immediately below the cover plate 31 to provide a wider gap or opening about the engine cylinder head, thus providing a substantially T-shaped outlet opening. The shroud portion 26b is also tapered inwardly towards the lower end of the cylinder and is thus disposed to closely encircle all the cylinder fins.

The above construction provides for variable air flow about the engine, provides for more quantity of air about the cylinder head and upper portion of the cylinder than about the lower half portion of the cylinder, in order to provide for a uniform dispersion of heat resulting in maintaining an overall uniform temperature of the cylinder devoid of objectionable hot spots.

Thus the general contour and shape of the shroud cooperating with the tangential entrance of the cooling air into the cylinder and cylinder head shroud and with the T-shaped outlet provide a cooling system of maximum efficiency for obtaining a maximum efficiency of overall engine performance.

While but one form of the invention is herein illustrated, it will be apparent to those skilled in the art to which this invention pertains that various modifications and changes may be made without departing from the spirit of the invention or from the scope of the appended claims.

We claim:

1. In an air cooled single cylinder engine having a vertically disposed finned cylinder and cylinder head and a crankshaft, a cooling system therefor comprising a blower mounted directly on the engine crankshaft and disposed at one end of said engine, a blower casing having an outlet discharging cooling air toward said engine cylinder and cylinder head, the greater part of said cylinder head disposed higher than a horizontal plane containing the uppermost edge of said blower outlet, and a shroud encircling both said cylinder and cylinder head and having an outlet on one side of said engine only, said shroud providing a vertical chimney open to said blower outlet and extending from the base of said cylinder to the top of said cylinder head, said shroud defining an air passage for flowing the cooling air around more than half of the cylinder and cylinder head in heat exchange relation to the fins carried thereby, said shroud outlet comprising a vertical opening extending from near the base of the cylinder to the top of said cylinder head, said opening being of greater unrestricted width adjacent the cyinder head than adjacent the cyinder, whereby to create some degree of back pressure to the cooling air flowing around the cylinder in order to induce relatively more flow of air upwardly through said chimney and thence around the cylinder head.

2. In an air cooled single cylinder engine having a vertically disposed finned cylinder and cylinder head and crankshaft, a cooling system therefor comprising a blower mounted directly on the engine crankshaft and disposed at one end of said engine, a blower casing having an outlet discharging cooling air toward said engine cylinder and cylinder head and offset laterally with respect to the central vertical engine plane containing the crankshaft axis, said blower outlet disposed to discharge the cooling air generally tangentially to the cylinder and cylinder head and generally in a direction parallel to the engine plane aforesaid, the greater part of said cylinder head disposed higher than a horizontal plane containing the uppermost edge of said blower outlet, and a shroud encircling both said cylinder and cylinder head and having an outlet on one side of said engine only and located on the side of the engine on the other side of said central vertical engine plane containing said crankshaft axis and discharging said cooling air normal to said plane, said shroud providing a vertical chimney adjacent said blower outlet, said chimney extending from the bottom of said cylinder to the top of said cylinder head, said shroud defining an air passage for flowing the cooling air around more than half of the cylinder and cylinder head in heat exchange relation to the fins carried thereby, said outlet of said shroud comprising a vertical opening extending from near the base of the cylinder to the top of said cylinder head, and said opening being of greater width adjacent the cylinder head than adjacent the cylinder.

References Cited in the file of this patent

UNITED STATES PATENTS

| | | |
|---|---|---|
| 1,608,286 | Andrews et al. | Nov. 23, 1926 |
| 1,683,602 | Brockway | Sept. 11, 1928 |
| 1,997,173 | Gosslau et al. | Apr. 9, 1935 |
| 2,031,891 | Irgens | Feb. 25, 1936 |
| 2,585,083 | Bouvy | Feb. 12, 1952 |